United States Patent [19]
Ottesen

[11] 4,016,603
[45] Apr. 5, 1977

[54] DISK STORAGE APPARATUS HAVING SIGNALS RECORDED IN A SPECIFIC FORMAT

[75] Inventor: Hjalmar Holmboe Ottesen, Oslo, Norway

[73] Assignee: International Business Machines Corporation, Armonk, N.Y.

[22] Filed: May 30, 1975

[21] Appl. No.: 582,515

[52] U.S. Cl. .................................. 360/135; 360/72
[51] Int. Cl.$^2$ ..................... G11B 5/82; G11B 17/22
[58] Field of Search ................ 360/135, 48, 49, 72, 360/75, 98, 99

[56] References Cited
UNITED STATES PATENTS

| | | | |
|---|---|---|---|
| 3,185,972 | 5/1965 | Sippel | 360/135 |
| 3,337,852 | 8/1967 | Lee et al. | 360/135 |

*Primary Examiner*—Robert S. Tupper
*Attorney, Agent, or Firm*—Herbert F. Somermeyer

[57] ABSTRACT

A record disk has a plurality of concentric record tracks divided into sectors of substantially equal lengths irrespective of the radius of the record track. In a preferred form, the record tracks are banded into radial groups, with the circumferential length of sectors in the radially inwardmost record track being equal in all of the bands. All track-identifying signals (servo signals) are radially aligned in each of the groups of tracks for providing sector servoing of a head to a given track. In those embodiments employing a plurality of independently accessible disks, a tachometer is attached to the assembly with all of the disks being keyed to a tachometer index such that all locations on each of the disks have a specific format relationship to the key and the tachometer. Each disk is separately calibrated such that its format has a calibratable relationship to the tachometer index. Additionally, the specific format enhances radial positioning of a transducer for track selection. In a more specific form, the outermost band of tracks has the greatest radial extent for accessing stored data. The specific format is particularly adaptable to those data processing apparatus employing fixed block length storage blocks.

34 Claims, 8 Drawing Figures

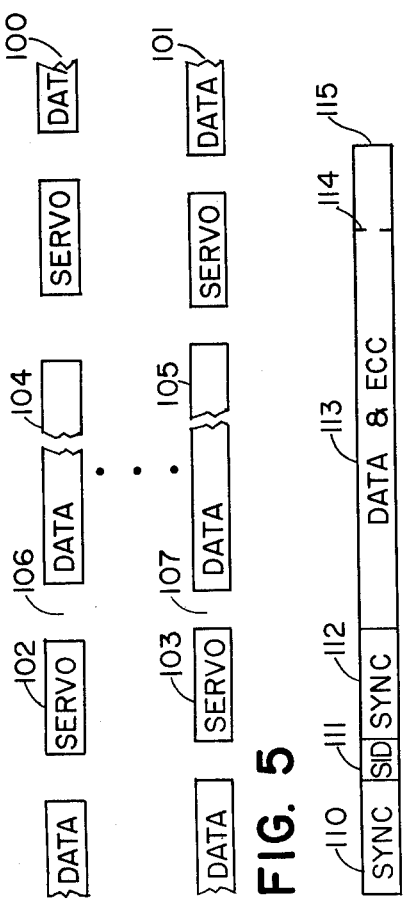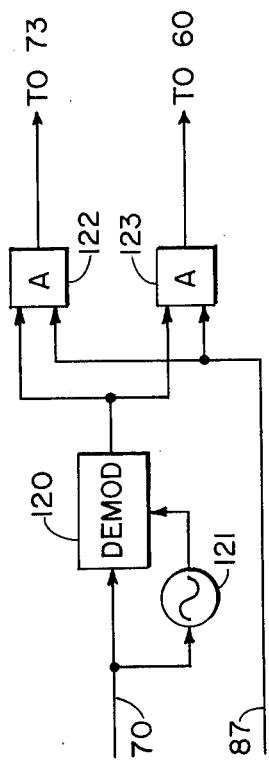

DISK STORAGE APPARATUS HAVING SIGNALS RECORDED IN A SPECIFIC FORMAT

DOCUMENTS INCORPORATED BY REFERENCE

Sippel U.S. Pat. No. 3,185,972 is cited for interleaved track-following servo and data signals.

Evans U.S. Pat. No. 3,348,213 is cited for disk record addressing apparatus.

Gindi U.S. Pat. No. 3,331,053 is cited for a format track associated with data tracks.

Applequist et al U.S. Pat. No. 3,208,057 is cited for an index mark in a disk record track.

BACKGROUND OF THE INVENTION

The present invention relates to disk storage apparatus and particularly to apparatus employing data recorded in the disk in a specific format.

Rotating magnetic storage disks have become quite popular in the data processing industry for storing large amounts of data and still having it relatively directly accessible on a random basis. Such disks have employed so-called "rigid" disks wherein a comb-shaped head support assembly moves radially in and out of an axial stack of such rigid disks. One of the disks is a servo-positioning disk, which determines the location of all tracks in all of the remaining disks which store data signals. One difficulty with such an arrangement is that the volumetric efficiency and cost come extremely high as the amount of data stored increases.

It is well known that flexible record media is much less expensive than rigid record media. Additionally, a flexible record disk can be stacked closer together, the apparatus could replace rigid disk packs resulting in a greater volumetric efficiency. An example of a disk storage apparatus employing a stack of flexible, rotatable, storage disks with independent access to each of the disks is shown by Raymond A. Barbeau et al in U.S. Pat. No. 3,852,820. The present invention is advantageously employed with such apparatus, as will become apparent, no limitation thereto intended.

As the recording density on rigid disks increases beyond that presently found in such record storage apparatus, some of the tolerance problems associated with track following, i.e., keeping a transducer centered over a record track, accessing tracks (selecting which track to transduce), and generally achieve reliable recording and readback, are solved by this invention and are applicable to rigid disk apparatus for solving problems of run-out, accurate track positioning, and other associated problems. Prior solutions to some of these have included zoning the disk record surface into radial bands such that the bit packing density for a given frequency of data transfer does not vary excessively from the outer radii to the inner radii of each zone. The data transfer rate varies from zone to zone—typically a 2-to-1 difference between innermost and outermost zones. This difference requires channels of different bandwidth. However, system problems, i.e., computer programming problems, associated with different length records, appear to have limited application of such banding. Additionally, banding has been known to provide for adaptive equalization of the readback signal. That is, equalization techniques for each band are automatically switched in accordance with the speed of the recording surface with respect to a sensing transducer.

Virtual memory mass store systems have advantageously employed fixed block lengths for facilitating space management and addressing techniques. Most data sets in common use have a variable length; hence, the program in virtual memory systems accommodates the variable block length to various techniques beyond the scope of the present specification. However, in managing storage space for use with virtual memory systems, a fixed block length has certain advantages.

SUMMARY OF THE INVENTION

It is an object of the present invention to provide a specific format for a record storage disk which not only accommodates system parameters, but also accommodates physical tolerances associated with rotation of record members which have a material effect on data track selection and data track following.

In accordance with one aspect of the present invention, the inventive format contemplates an effective common-length sectorization of the record surface for facilitating recording employing fixed block space management techniques. When a record disk is banded in accordance with different radii, the common length is preferably either associated with the radially inward record track, with all other record tracks within the same band being radially aligned; i.e., the angles subtended by all sectors in a band are the same.

In a subaspect of the present invention, the radially outward band has the greatest radial extent for facilitating most rapid and easiest access to the maximum amount of data on a record storage surface. To maximize capacity of a given disk, the zones can have different widths such that an integral number of records will fit exactly on the innermost track of each zone. To do this, both the band inner radii and home sector can be of variable length.

In another aspect of the invention, a common radial index is associated with all bands, with all common-length sectors using the common radial index as a base of angular address calculation. Each track has a home address portion immediately adjacent the angular index and a variable length between the various bands for accommodating arbitrary design of formats on a given record surface.

The specific format of the present invention, when employed in apparatus having a stack of disks, preferably includes a common tachometer keyed to a common shaft. Each of the record storage disks are also keyed to the common shaft such that the abovementioned home address has a predetermined angular position with respect to the tachometer index. To accommodate tolerances, variation of such angular position for each of the disks is stored in the apparatus and used to calibrate the angular addressing of each of the disks.

In an alternative embodiment, such tachometer index and key are recorded on the outer periphery of each of the storage disks.

In a further aspect of the invention, the common radial angular index is employed to advantage for radial positioning for facilitating rapid track accessing.

The foregoing and other objects, features, and advantages of the invention will become apparent from the following more particular description of a preferred embodiment thereof, as illustrated in the accompanying drawing.

THE DRAWING

FIG. 5 is a diagrammatic showing of a preferred track format usable in conjunction with the FIG. 3 illustrated format.

FIG. 6 is a diagrammatic showing of a data sector usable with the FIG. 5 illustrated track format.

FIG. 7 is a sector addressing timing diagram.

FIG. 8 is a simplified diagram of a servo and data signal separator usable with the FIG. 4 illustrated apparatus.

DETAILED DESCRIPTION

Referring more particularly to the appended drawing, like numerals indicate like parts and structural features in the various views and diagrams.

Figure 1:
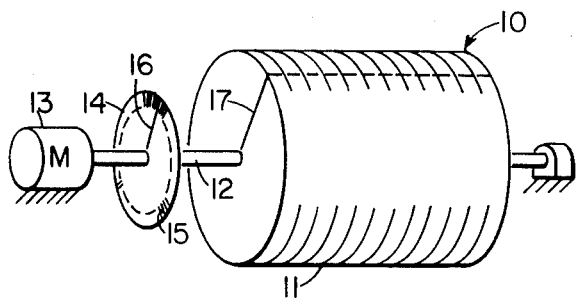
FIG. 1 is a simplified diagrammatic perspective of the storage apparatus with which the present invention may be advantageously employed.
Figure 2:
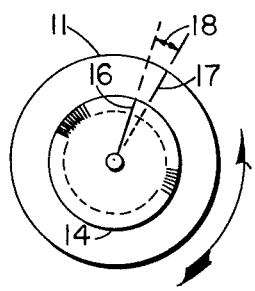
FIG. 2 is a diagrammatic showing of a circumferential relationship between an angular index indicator or tachometer and a record storage disk fiducial mark (angular index).
Figure 4:
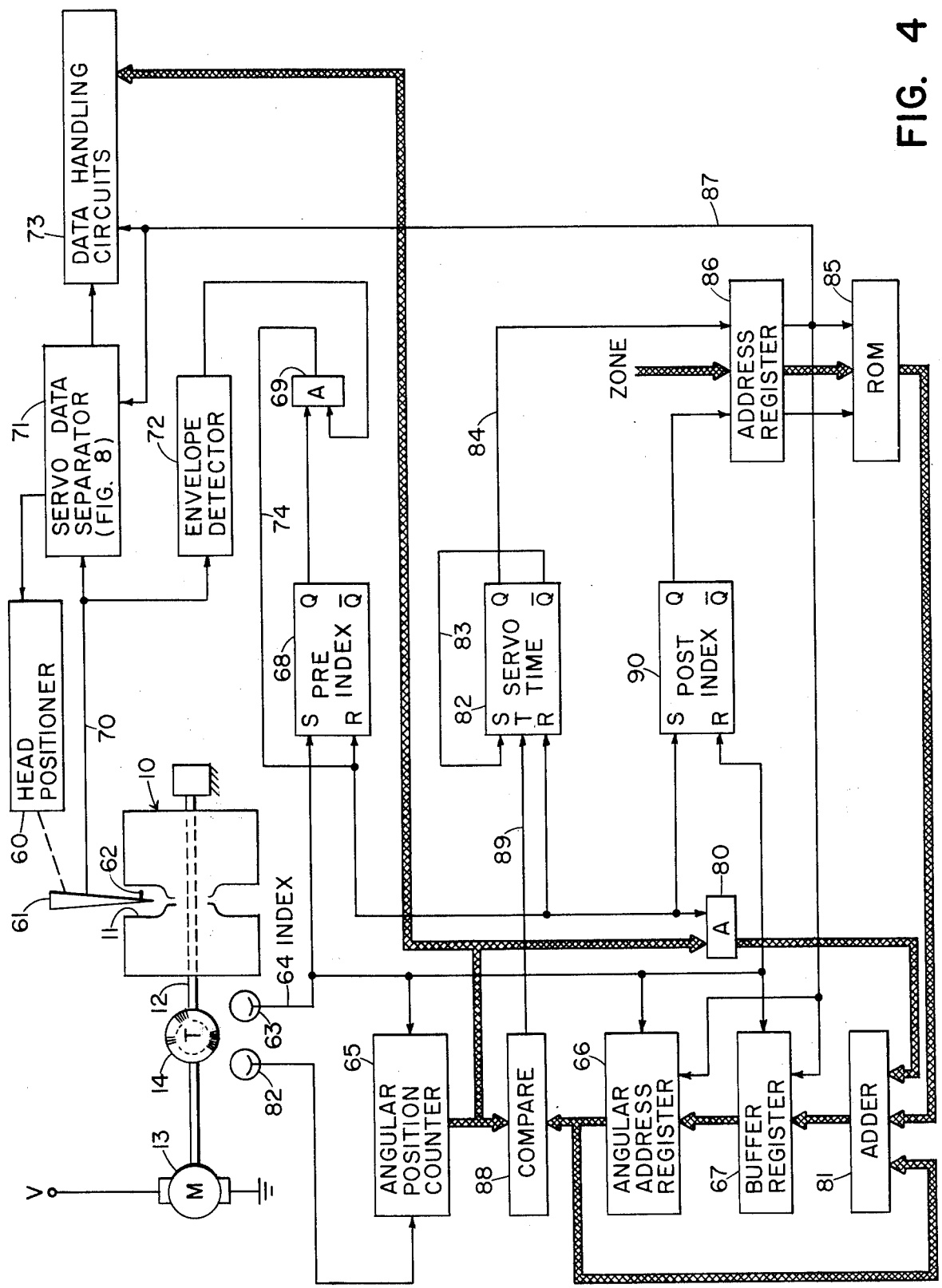
FIG. 4 is a diagrammatic and block signal flow showing of apparatus employing the FIG. 3 illustrated format.

In FIG. 1, a coaxial stack 10 of record disks 11 is mounted for rotation as a unit on a common shaft 12 driven by a single motor 13. An angular position-indicating tachometer disk 14 is secured to shaft 12. Tachometer 14, in addition to having angular index marks 15, has a single fiducial mark 16 relating to a keyway (later shown and described) which circumferentially aligns all of the disks in stack 10 such that the fiducial mark 17 recorded separately on a common radius from all of the disks has a measurable and predetermined relationship to tachometer index 16. Because of manufacturing tolerances associated with assembly of such apparatus, tachometer mark 16 may be angularly displaced from fiducial radial line 17 by an angle indicated at 18 in FIG. 2. The FIG. 4 illustrated apparatus shows how such displacement, which may be different for each of the storage disks 11, is automatically accommodated such that the specific format of the present invention accommodates manufacturing tolerances of a stack 10 of record storage disks of either the flexible or rigid type.

Figure 3:
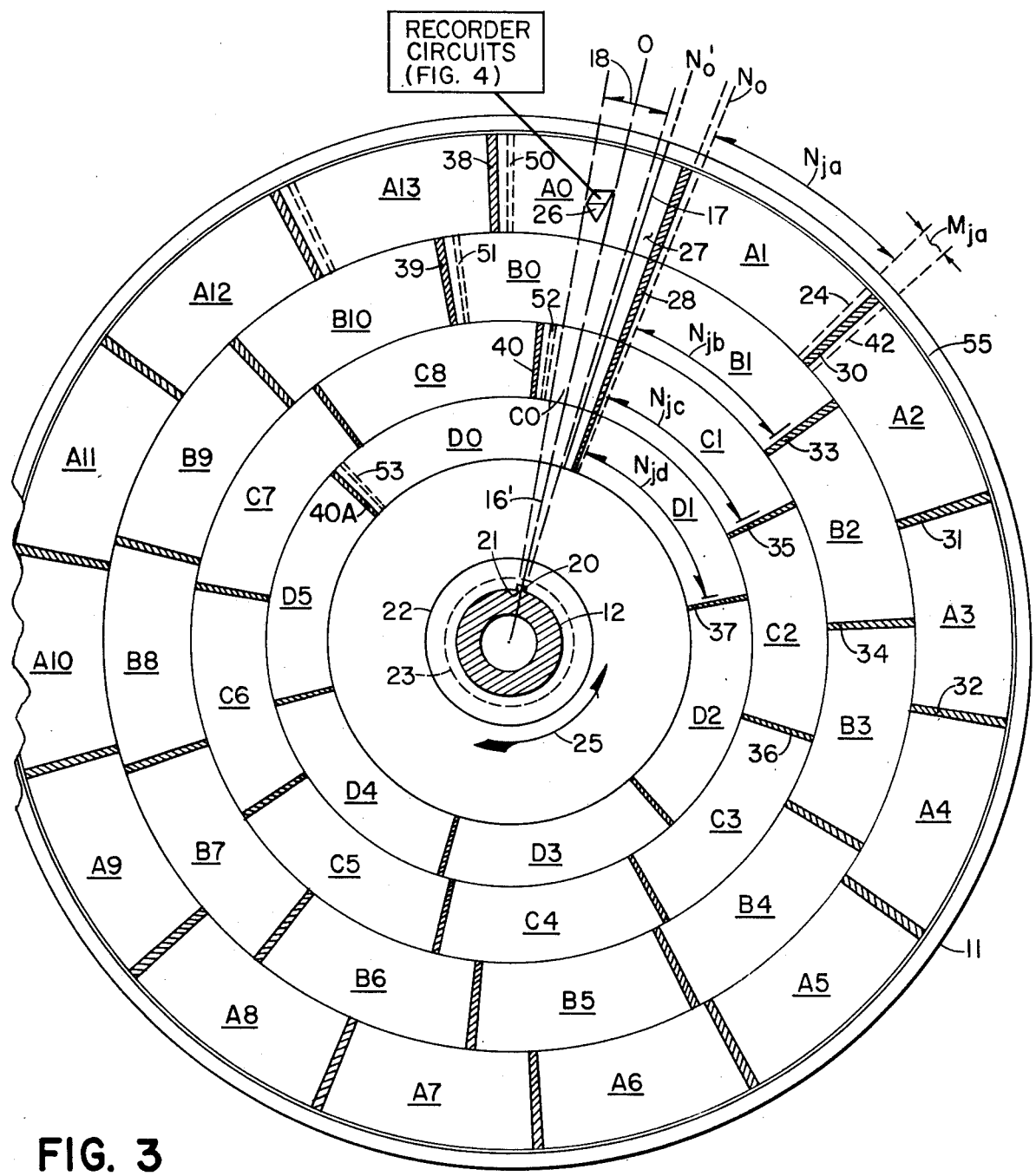
FIG. 3 is a diagrammatic showing of a record disk constructed in accordance with the present invention.

Referring next to FIG. 3, the preferred format configuration of the present invention is shown in detail and is described first for better understanding the later description of the operation of the circuits shown in FIG. 4. The disk 11, suitably secured to tubular spindle 12, is circumferentially oriented by a key 20 of shaft 12 engaged with a keyway 21 in rigid disk-supporting washer 22. Washer 22 has an outer annular recess indicated by dash line 23 for receiving disk 11. The two members 22 and 11 are preferably adhesively secured. The assembly of the stack 10 then involves accurately positioning each disk 11 on its corresponding center support washer 22 and aligning keyway 21 with radially extending fiducial line 17 of each of the disks. Even though precise manufacturing tooling may be used, such assembly still is subject to tolerances. It is preferred that the disks are prerecorded with the servo information before the pack is assembled and each disk is keyed. The prerecording can be done with a magnetic transfer technique at the same time the disks and washers are assembled.

Accordingly, tolerance angle 18 is established with the later-described FIG. 4 circuits designed to accommodate those tolerances for precisely identifying the sectors on disk 11. The tachometer index 16 is represented in FIG. 3 by dash line 16'. It is preferred that the manufacturing tolerances be symmetrically disposed about the ideal or perfect match indicated by line 16'. It should be noted that the tachometer index 16' is upstream from radial fiducial line 17 by an angle greater than the tolerance in angle 18, as will become apparent. This enables the electronic circuits to initialize based upon tachometer index 16 and then calibrate each disk accommodating the tolerances such that the radial fiducial line 17 is precisely located and can be used to identify angular locations of each and every sector in any of the illustrated recording zones A, B, C, or D of disk 11. Since it is preferred angular addressing be used for identifying sector locations, tolerance angle 18 lies in what is termed a "home address area" identified in FIG. 3 by the sectors AO, BO, C0, and DO, Hence, as will become more apparent, the home address areas must have an angular extent greater than the maximum manufacturing tolerance angle 18, or special circuits beyond the scope of the present description have to be used to accommodate locating tachometer index 16' outside of the home address area (as will be defined), or a fiducial mark for timing purposes can be incorporated on disk 11 itself, as will be described later with respect to FIG. 7. Additionally, the home address areas may have different circumferential lengths within a zone.

The geometric layout of the data sector, servo sectors, the home address area, and their respective functions will be described with particular emphasis on showing the relationship of the circumferential positioning of the disk 11 with respect to key 20. Each disk 11 is divided into four recording bands of different radii. The outer band A consisting of recording sectors AO-A13 has the greatest radial extent. The next band B has the next-greatest radial extent, C has a lesser extent, and D (the radially inwardmost band) has the least radial extent. As shown in FIG. 3, the ratios are 5, 6, 7, and 8, respectively, for D, C, B, and A. As will be described later, the most-preferred ratio of radial extents is designed to accommodate maximum data transfer in a virtual memory system for minimizing radial head movements. In each band of recording, all signals are radially aligned; i.e., each signal has the same angular address in each and every track. For example, in band A, there may be 455 tracks, each track containing 16,000 signals. Each and every signal from the beginning of the sector A1, as as NO, through the end of the data sector, as at 24, is identically, angularly addressed, such as done today in disk files having one band. In a similar manner, zones B, C, and D have their own unique angular addressing as represented by the symbols $N_{ja}$, $N_{jb}$, $N_{jc}$, and $N_{jd}$, the term N indicating the angular displacement and the subcripts ja, etc., denoting that the angle for each of the zones in unique. Each and every sector in the same band, however, has the same angular displacement. For angularly addressing any of the sectors, all computations are based on the tachometer index 16' as calibrated for each of the disks 11. Radial fiducial line 17 has an angular index count of $N_0'$. Since $N_0'$ is the same for all bands, this constitutes the fiducial mark for all signals on each of the disks 11.

As disk 11 rotates in the direction of arrow 25, a head 26 scanning a track in band A after encountering radial fiducial line 17 traverses an erase gap at 27. It then enters sector servo signal area 28, which is displaced a predetermined angle $N_0$ from tachometer index 16'. This sector servo 28 has the same reference spot for all bands of signals. The inter-relationship of the sector servo area 28 and the other sector servo areas represented in FIG. 3 by the hashed areas, as at 30–40 and the unnumbered hashed areas, can be constructed in accordance with the Sippel patent, supra, Any track indicating track servoing and locating patterns may be used with the present invention.

Returning now to the angular addressing for Zone A, with the description being applicable to Zones B–D, beginning of data in the first sector of each of the Zones A1–D1 is indicated by angular address $N_0$. The space between sector area 28 and $N_0$ is an erase gap (can be a signal burst type IBG). The angular extent of the data area in $N_{ka}$, with angular address $N_0$ plus $N_{ka}$ indicating end of data, as at 24. The sector servo area 30, plus the gap to end of data 24 and an additional gap to beginning of data at 42 for sector A2, is measured by the angular displacement $M_{ka}$. Hence, the beginning of data for sector A2 is the angular displacement $N_0 + N_{ka} + M_{ka}$. For beginning of data in any of the sectors, the angular displacement $N_d$ is set forth by the following equation:

$$N_d = N_0 + (K-1)(N_{ka} + M_{ka}) \qquad (1)$$

The above equation is for the kth sector. Correspondingly, the end of data for the kth sector which is denoted by $E_d$ is given by the below equation:

$$E_d = N_0 + (K-1)(N_{ka} + M_{ka}) + N_{ka} \qquad (2)$$

The FIG. 4 illustrated circuits solve the above two equations for gating data signals to data processing circuits and gating the servo signals from the servo sectors 28 and 30–40 to their described servo circuits. Such gating is in accordance generally with the Sippel patent, supra.

Each of the data sections A1–D5 have an identical tangential length at the innermost radius of the respective bands. This facilitates storing fixed length blocks of data signals in any of the segments. According to known virtual memory space management algorithms, management of fixed length blocks is much easier than that of variable length blocks. It is also seen that the arrangement tends to maximize storage on a disk surface; while limiting the bandwidth of the readback signals, the frequency change from the innermost to the outermost position of the bands is controlled.

The home address sectors AO, BO, CO, and DO, each of which can be of variable length, provide two functions in each section as at 50 for AO, 51 for BO, 52 for CO, and 53 for DO, In a first portion, record track identification and control information is stored, such as information to identify bad sectors and identify the zone. A record portion contains other status information as may be desired for availability and reliability purpose. It should be noted that areas 50–53 are immediately adjacent the last servo sections 38, 39, 40, and 40A to permit the maximum tolerance for accepting tolerance angle 18 between the trailingmost portion of the HA record area 52 closest to fiducial line 17. That is, it is desired to reset the tangential counter until completion of reading the control information in areas 50–53. It should be appreciated that the length of the records 50–53 is predetermined, such that the tachometer count for each of the zones is predetermined for degating the data processing circuits in preparation to sensing fiducial line 17. The angular displacement between areas 50–53 and fiducial line 17 is independent for each of the zones and is stored as will be later described.

While the FIG. 1 illustrated embodiment shows a separate tachometer disk for generating a tachometer reference 16 to calibrate the format locations in all of the disks 11, an alternative approach is to provide tachometer information at the outer periphery of disk 11 as in a data area 55 which may consist of one or more tracks of information. In this regard, the general teaching of Sippel, supra, can be followed and is more fully described later with respect to FIG. 7.

Another important aspect of the FIG. 3 illustrated format is the accommodation of radial run-out of rotating disk memories, as well as accommodation of orthogonal creep in flexible media. The first-mentioned problem is based upon bearing, wear, and eccentricities introduced into the apparatus during manufacturing; while at lower track densities, for example, up to 200 tracks per inch (tpi), such eccentricities and run-out may not be a serious problem. However, when one attempts to record at 1,000 tpi or more, such run-out can be a problem. This track-to-track minimum spacing for 1,000 tpi is 0.001 inch. If there is a guard band between adjacent tracks, then the total track width may be more like 0.005 inch. Since magnetic transducers have a decided reduced sensed amplitude, and the transducing gap is scanning less than one-half the track, the actual tolerance for run-out is much less than the actual track width. Hence, it is important that the transducer track-following system faithfully follow the tracks. While track following employing data signals has been used in the past, the energy content of such signals at high track densities is so low that track following is not practical. Hence, improved track-following procedures must be provided. In the case of flexible media, the substrate often consists of a flexible resin, such as polyester, cellulose acetate, and the like. Such materials have been known to change their shape over periods of time. This is a so-called "visco-elastic" effect. In the case of polyester, the dimensional changes along one axis can be substantially different than such dimensional changes along a transverse axis. It is believed that this is caused by the fabrication process in which the polyester film is fabricated by a rolling mill. Such fabrication induces antisotropic strains in the film which result in the orthogonally, dimensionally different changes. When a record disk 11 includes such a substrate, the result on the disk shape is that it is no longer circular, but slightly elliptical. In a 15' diameter disk, for example, the difference in dimensional changes may be as much as 0.002 inch. Such dimensional instabilities of static per revolution of disk 11 are dynamic over a long period of time, resulting in track-following problems.

The solution afforded by the present invention is employing sector servoing techniques to maintain a substantially constant spacing between adjacent servo sectors as between sectors 28 and 30. It is seen that the variation in circumferential distance between servo sectors 28 and 30 is the maximum at the outer radius, which is very little greater than the minimum distance at the inner radius. the maximum circumferential distance is determined by the servo response and its ability to predict changes in the track and to track density, as well as the rate of change of the track from a pure circular configuration. Hence, in selecting a format in accordance with the present invention, not only must the minimum tangential distance be selected for each data sector, but also the maximum circumferential length for each sector as measured between the effective center of two adjacent servo sectors. It is preferred, for simplicity purposes, to keep one data block between two sector servos, although it is permissible to interleave additional servo sectors within a data block in order to accomplish the objectives stated for this invention.

One implementation of the invention is described. The FIG. 4 illustrated apparatus is designed to work with the FIG. 3 illustrated disk format employed in the FIG. 1 illustrated apparatus. The timing of operations of the FIG. 4 illustrated apparatus is shown in FIG. 7, with the track formats being shown in FIGS. 5 and 6, as late detailed. The description assumes that head positioner 60 has moved head support arm 61 into the transducer access such that transducer head 62 (corresponding to head 26 of FIG. 3) is scanning a desired track to be accessed. The description will start with photosensing unit 63 sensing the tachometer index mark 16 supplying a tachometer index signal 63A over line 64 to reset the angular positioning sensing and controlling circuits which include resetting angular position counter 65, angular address register 66, and buffer register 67. Additionally, pre-index flip-flop 68 is set to the active condition signifying that the transducer 62 is scanning the erase portion prior to the disk radial index line 17, as best seen in FIG. 3 extending between dash line 16' identifying the angular position of tachometer index mark 16 to radial line 17. A pre-index flip-flop 68 conditions AND circuit 69 to respond to a signal signifying detection of the disk fiducial line 17 signal to supply a disk index signal 75 over line 74.

The disk index signals, and all other control signals, are produced initially by transducer 62 sensing the signals represented by the FIG. 3 illustrated format and supplying same over line 70 to servo and data signal separator 71 and to envelope detector 72. Servo and data signal separator 71 supplies the servo-separated signals to head positioner 60 for enabling transducer 62 to faithfully scan the track being accessed, as is well known in the disk recording arts. Additionally, separator 71 supplies the separated data signals to data handling circuits 73 for processing in a known manner. Techniques of data handling circuits 73 bear no significance on practicing the present invention and, hence, are omitted for purposes of brevity. Envelope detector 72, upon receiving the signal generated by transducer 62 corresponding to disk fiducial line 17, supplies an active signal to AND circuit 69, AND circuit 69 being conditioned by preindex flip-flop 68 to pass the envelope detector 72 signal to line 74 as the disk index signal 75. This corresponds in time with transducer 62 scanning radial fiducial line 17.

Disk index signal 75 conditions AND circuits 80 to pass the signal content of angular position counter 65 to adder 81 in preparation for normalizing the content of angular address register 66 to the zone in which 62 is scanning a given track. Photosensing unit 82 senses the tachometer marks 84 and supplies tachometer signals to increment the content of angular position counter 65. At the time disk index signal 75 occurs, the signal content of angular position counter 65 is $N_0$, the calibrated displacement between tachometer index 16 and radial fiducial line 17. This content is supplied through adder 81 to buffer register 67 in preparation for insertion into angular address register 66.

Insertion of such content into angular address register 66 is now described. Disk index pulse 75 on line 74 also resets servo time trigger flip-flop 82. It being reset supplies an activating signal over the complement output line 83 which, in turn, causes the servo time trigger to be set; i.e., it acts as a monostable multivibrator. As such, a negative pulse is supplied over line 84 to read-only memory 85 input address register 86. One position of register 86 indicates whether head 62 is scanning servo signals or data signals. This indicating signal is supplied over line 87 to ROM 85 for addressing, as will be later described, to servo data separator 71 and to data handling circuit 73. Additionally, it acts as a strobe to insert signals into buffer register 67 and angular address register 66. Hence, the signals passed from AND's 80 to adder 81 ($N_0$) are supplied to buffer register 67 and angular address register 66. This action is so fast that angular position counter 65 has not yet counted past the $N_0$ tachometer counts. Hence, digital compare circuit 88 indicates a compare successful signal on line 89 to trigger servo time trigger 82 to the reset state indicating not servo time.

Additionally, disk index signal 75 on line 74 sets the post index flip-flop 90 to the active condition. This forces a binary 1 into address register 86. As set forth in the table below, the addresses of register 86 access one of the nine registers in ROM 85. The addresses are set forth in the lefthand column, wherein the X's indicate "don't cares," and the content of the registers corresponds to the angular displacements defined with respect to FIG. 3. The middle symbol indicates the zone, the lefthand symbol indicates the activity of the post index flip-flop, and the righthand symbol indicates the activity of the servo time trigger 82. Each time trigger 82 is triggered by a signal on line 89, it acts as a monostable multivibrator for the duration of the servo time such that the appropriate numerical content of the registers is supplied through adder 81 to buffer 67 and angular address register 66.

| ROM ADDRESS TABLE | |
|---|---|
| Address | Content |
| OXX | $N_0$ |
| 1A0 | $N_{ja}$ |
| 1A1 | $M_{ja}$ |
| 1B0 | $N_{jb}$ |
| 1B1 | $M_{jb}$ |
| 1C0 | $N_{jc}$ |
| 1C1 | $M_{jc}$ |
| 1D0 | $N_{jd}$ |
| 1D1 | $M_{jd}$ |

Each time servo time flip-flop 82 is triggered by compare 88, the signal content of the address register of ROM 85 as indicated by register 86 is transferred to adder 81 and added to the content of angular address register 66 for updating the angular address for the next data section or the next servo section, as the case may be. The above action is repeated for the duration of the track. A recurrence of the tachometer index signal on line 64 restarts and recalibrates the angular addressing of the track. Hence, even with error conditions, there is automatic recovery because of the recalibration aspects of the present invention. Servo time trigger 82 is triggered at the beginning of each data set of signals and each servo set of signals. referring to FIG. 3, this is done at the beginning or leading edge portion of servo section 28, as defined as $M_{ja}$, as well as beginning of the data section for a 1, such as at $N_0$. Construction of the ROM can be using known read-only memory techniques, such as capacitive memories, semiconductive memories, mechanical pinboards, electrically settable flip-flops, and the like. Triggering of servo time trigger 82 is best seen in FIG. 7 in the lines labeled Servo Time Zones A-D, wherein each pulse corresponds to two triggers of the trigger 82, one at the beginning of the pulse 28, for example, and one at the trailing edge of pulse 28, for example.

Referring to FIG. 5, the dimensions of a track are shown in diagrammatic form. Upper track 100 is a radial inward track, while the lower track 101 is a radial outward track. Note that the lineal extent of the servo areas 102 is less than any extent of servo area 103. Both servo areas 102 and 103 distend the same angle within the zone. In a similar manner, data area 104 has a shorter lineal length than data area 105 while distending the same angle. Accordingly, in accordance with known disk-sensing techniques, the readback circuits accommodate different lineal lengths for operating at different frequencies: i.e., the surface speed of the disks at different radial positions is different resulting in differing lineal lengths. It is important for successful operation that the various servo and data portions subtend substantially the same angle. In some instances, the servo portions may have exactly the same lineal length thereby distending different angles. In this case, the erase portions or interblock gaps, such as at 106 and 107, vary for accommodating such differences.

FIG. 6 is a diagrammatic showing of the signal arrangements within one data section, such as 104 and 105 of FIG. 5. The leading portion is a clock synchronization area 110 followed by a sector ID section SID 111, followed by an IBG synchronization portion 112. Actual data and error correction codes follow in area 113. Termination of area 113 is by an erase portion or additional synchronization signals preceding the servo area. It is desired that an erase portion be used such that variable data lengths can be recorded in the fixed sector lengths. For example, dash line 114 signifies that a short record is recorded. In a preferred mode, the area between end of data at 114 and end of the data sector portion as at 115 is filled with padding signals, such as all 0's, all 1's, or some peculiar pattern signifying the padding. The latter can be a series of wavelengths longer than that encountered in the data in error correction code recording.

Servo signal and data signal separaator 71 can be a relatively simple circuit, such as that shown in FIG. 8. Signals from transducer 62, which are suitably amplified, are supplied to a synchronous demodulator circuit 120 which is synchronized by a variable frequency oscillator 121 slaved to the input signal received on line 70. The output of the demodulator 120 is supplied to a pair of analog gates or AND circuits 122 and 123. These gates are alternately actuated by the signal received over line 87, AND 122 responding to line 87 being relatively negative to pass data signals to data handling circuits 73, and AND circuit 123 responding to the line 87 signal being relatively positive to pass servo signals to head positioner 60.

While the invention has been particularly shown and described with reference to a preferred embodiment thereof, it will be understood by those skilled in the art that various changes in form and detail may be made therein without departing from the spirit and scope of the invention.

What is claimed is:

1. A circular planar magnetic storage disk having a plurality of substantially concentric record track location indicating signals,
   the improvement including in combination:
   said indicating signals being disposed in a plurality of radially defined groups;
   said indicating signals in each said radial group for indicating respective record tracks in each said group being in circumferentially spaced-apart sets of radially aligned signals; and
   circumferential spacing between predetermined circumferentially adjacent ones of said radially aligned signals disposed at a predetermined radial position in each said group being circumferentially spaced a substantially identical lineal distance along the respective indicated record tracks.

2. The circular magnetic storage disk set forth in claim 1 and further including in combination:
   a radially extending fiducial line magnetically recorded on said storage disk, all of said indicating signals being disposed a predetermined circumferential distance from said fiducial line in the various groups, and signals in each group having different circumferential distances from said fiducial line.

3. The circular magnetic storage disk set forth in claim 2 wherein said disk is adapted to rotate in a first rotational sense in the plane of said tracks;
   all of said indicating signals being said predetermined distances when measured in said first rotational sense; and
   a record area intermediate the last ones of said indicating signals in each of said groups, and said radially extending fiducial line having home address signals indicating radial position of each and every track, respectively.

4. The circular magnetic storage disk set forth in claim 3 wherein said identical lineal distance in the various groups occurs between all indicated signals and said radial fiducial line except in said home address area.

5. The circular magnetic storage disk set forth in claim 2 wherein said disk is ring-shaped with a circular aperture of predetermined size and having a keyway in said inner aperture with said keyway having a predetermined angular position with respect to said radially extending fiducial line.

6. The circular magnetic storage disk set forth in claim 5 wherein said keyway has an angular positional relationship with respect to said fiducial line such that it is always on the home address side of said fiducial line and having an angular displacement less than the angular displacement of a shortest one of said home address areas.

7. The circular magnetic storage disk set forth in claim 6 further including tachometer means for indicating angular positions of said disk such that each and every one of said indicating signals is identifiable in an angular positional context.

8. The circular magnetic storage disk set forth in claim 7 further including a fiducial mark on said tachometer having a predetermined relationship to said keyway whereby the angular position of said disk and said tachometer is measurable by the angular relationship between said fiducial line, said keyway, and said fiducial mark on said tachometer.

9. A coaxial stack of commonly rotatable circular magnetic storage disks set forth in claim 8 wherein:
   each of said storage disks being a flexible storage disk and being axially spaced from an adjacent disk a space less than required for accessing a surface of said disks such that said disks must be axially parted for transducing access;
   means aligning all keyways of all of said circular magnetic storage disks; and
   said tachometer means being a single separate disk mounted for rotation with said stack of flexible disks such that said fiducial mark of said tachometer has a predetermined angular positional relationship to said keyways.

10. A stack of circular magnetic storage disks set forth in claim 9 further including means calibrating the positional relationship of each and every one of said circular magnetic storage disks with respect to said tachometer fiducial mark.

11. The stack of circular magnetic storage disks set forth in claim 10 wherein the angular displacement between adjacent ones of said indicating signals is equal within each of said bands and being unequal as between said bands.

12. The circular magnetic storage disk set forth in claim 1 wherein the radial extents of said groups of tracks are different with an outer one of said groups having a maximal radial extent.

13. The circular magnetic storage disk set forth in claim 12 wherein the radial extents of said groups of tracks are a minimal adjacent a radial inwardmost position and maximal adjacent a radial maximum position; and
   there being at last four of said groups.

14. A circular magnetic storage disk having a plurality of circumferentially spaced-apart concentric record track-indicating signals,
   the improvement comprising:
   said indicating signals being disposed in a plurality of radial groups, said signals in each group for indicating respective tracks being in equal angular spaced sets of signals, the angle of said spaced sets in said radial groups being different from an angle of said spaced sets in each and every other ones of said radial groups; and
   a group with the greatest radius having a greater number of track-indicating signals than another of said groups for indicating a greater number of said concentric record tracks.

15. The circular magnetic storage disk set forth in claim 14 wherein said circumferentially spacedapart concentric record track-indicating signal includes servo signal patterns indicating center lines of the respective ones of said concentric record tracks whereby track seeking and track following servo operations are performed on said indicating signals.

16. The circular magnetic storage disk set forth in claim 14 further including an effectively continuous radial fiducial line extending across all of said radial groups for identifying a reference position on said circular magnetic storage disk; and
   all of said indicating signals being circumferentially spaced a predetermined distance from said radial fiducial line, each set of indicating signals in each of said radial groups being spaced its own unique circumferential distance when measured in a first rotational sense from said fiducial line.

17. The circular magnetic storage disk set forth in claim 16 wherein said circular magnetic storage disk has a center aperture for mounting said disk for rotation and having a keyway in said aperture for identifying, within predetermined angular tolerances, the physical location of said fiducial line such that when said disk is mounted, said keyway serves to orient the disk with respect to said fiducial line.

18. The circular magnetic storage disk set forth in claim 17 further including tachometer means for indicating the angular position of said disk.

19. The circular magnetic storage disk set forth in claim 18 further including a fiducial mark on said tachometer and including means indicating angular displacement between said keyway and said fiducial line.

20. The circular magnetic storage disk set forth in claim 14 further including in combination:
   the radial extent of said radial groups being greater at an outer extremity of said disks than at an inner extremity with each radially outward radial group having a greater extent than the next adjacent inward radial group.

21. The circular record storage disk set forth in claim 14 wherein each of said indicating signals are circumferentially spaced apart an equal circumferential lineal distance and includes signal patterns for track following operations; and
   the circumferential lineal space between a last one of said indicating signals in each of said radial groups and said fiducial line, when measured in said first rotational sense, being other than said identical distance.

22. The circular magnetic storage disk set forth in claim 21 further including means indicating angular position of said fiducial line.

23. The circular magnetic storage disk set forth in claim 14 further including a home address area disposed intermediate said last one of said indicating signals and said fiducial line in each and every one of said concentric tracks.

24. Record storage apparatus having a coaxial stack of closely spaced-apart flexible circular record disks mounted on a common spindle for co-rotation and including means for accessing a selected one of said disks from the periphery of said disks, said accessing means including a magnetic transducer,
   the improvement including means for facilitating control of said record storage apparatus in combination:
   each of said flexible record storage disks having a set of substantially identical track-indicating signals;
   said track-indicating signals on each disk being arranged in radial groups of equally circumferentially spaced-apart relationship for identifying radial track position;
   a radial fiducial line extending through all of said groups for identifying a reference position on each and every of said disks, said reference positions of each disk being independent of the reference position of each and every other disk; and
   a tachometer means operatively associated with said stack indicating rotational position thereof and including a fiducial mark for enabling calibration of rotational position of each and every disk between the fiducial marks on the disk and the fiducial mark on said tachometer.

25. The record storage apparatus set forth in claim 24 further including on each and every said disk a predetermined space between said radialextending fiducial line and selected ones of said indicating signals wherein home address information is recorded for identifying each and every track by a unique address indicia; and said record storage apparatus adapted to rotate said stack of record storage disks in a first sense about said spindle, and said home address area being immediately adjacent said fiducial line such that said transducer reads said home address immediately preceding reading said fiducial line.

26. The record storage apparatus set forth in claim 25 wherein the angular displacement of said indicating signals within each of said radial groups of signals being equal except for said home address area angular displacement which may be different.

27. The record storage apparatus set forth in claim 24 further including in combination:

means responsive to said tachometer to digitally indicate angular position of the tachometer disk with respect to said fiducial mark on said tachometer;

storage means in said record storage apparatus storing the angular displacement of each and every said fiducial lines on each and every respective ones of said disks with respect to said tachometer fiducial mark;

angular address control means responsive to said digital anular position indication to signify angular position of a selected one of said disks; and means calibrating said angular position control means for the angular displacement between said tachometer fiducial mark and the fiducial mark of the selected disk.

28. The record storage apparatus set forth in claim 27 further including radial group address indicating means;

digital means in said angular position control means translating said group indication into angular displacements; and adder means in said angular position control means for repeatedly adding said last-mentioned angular displacement indications to a total angular address for signifying instantaneous position of a selected one of said record disks.

29. The record storage apparatus set forth in claim 28 wherein the radial extent of said groups being a maximum at a radial outword position and a minimum at a radial inward position on each and every one of said disks; and the number of groups being greater than two and being identical in each and every one of said disks such that said group-indicated angular displacement is the same for all of said disks through said calibration.

30. The record storage apparatus set forth in claim 29 further including a home address area on each and every one of said record tracks in each and every one of said record disks, said, home address area indicating the radial position of the record storage track and indicating the record storage disks axial address.

31. The record storage apparatus set forth in claim 30 wherein said angular position calibrating digital data stored in the read only memory separate from said stack of disks and all of said group displacement units angular displacements being stored in the same read only memory; and said read only memory being responsive to said group-indicating signals to supply angular displacements in accordance therewith.

32. An angular position calibrator for addressing angular positions in a given circular record track on a given circular disk record member, the improvement including in combination:

a tachometer system having a tach index mark;

an address counter register responsive to said tachometer system to indicate angular displacement and responsive to said tach index mark to reset to a reference displacement indication;

an angular address register;

a digital compare circuit coupled to said address counter register and said angular address register for indicating that a desired angular address has been reached;

storage means (ROM) storing tach index to disk index displacement indication; and means receiving said index displacement indication and modifying signal content of one of said registers to calibrate angular address of said given record track for precise angular addressing.

33. The method of accessing a given record track of a circular record medium having angular position indicating markings with a transducer relatively radially movable with respect to said circular record medium, a tachometer having angular position indicating markings with a given angular relationship to said record medium which may vary from track to track and each track having track indicating signals;

the steps of:

continuously relatively radially moving said transducer and circular record medium toward said given record track while simultaneously establishing and indicating said given angular relationship for said given record track;

upon reaching a radial position approximately that of said given circular record track, stopping said continuous relative radial motion;

reading a track indicating signal at said approximate radial position;

relatively moving said transducer and said circular record medium from track to track in a stepping mode in accordance with said read track indicating signal until said given record track is reached; and accessing angular portions of said given record track by using said tachometer to angularly address said given circular record track in accordance with said given angular relationship for said given circular record track.

34. The method of accommodating eccentricities in rotational relative motion between a transducer and a somewhat planar record medium wherein the relative rotational motion is parallel to the plane of said record medium, said rotational motion being on any one of a plurality of tracks at different radii;

the steps of:

dividing said tracks into a plurality of radial groups;

within each said group, measuring dynamic record track radial position within a same period of time irrespective of radii of any record track and relative angular displacement between said medium and said transducer; and initiating adjustment of relative radial position between said record track and said transducer in accordance with each said measurement.

* * * * *